United States Patent [19]
Blanyer

[11] 3,721,821
[45] March 20, 1973

[54] RAILWAY WHEEL SENSOR
[75] Inventor: Carl G. Blanyer, West Covina, Calif.
[73] Assignee: Abex Corporation, New York, N.Y.
[22] Filed: Dec. 14, 1970
[21] Appl. No.: 97,602

[52] U.S. Cl. ..........................246/249, 340/285
[51] Int. Cl. ..........................................B61l 13/04
[58] Field of Search ..........246/249; 340/258 R, 285; 324/179

[56] References Cited

UNITED STATES PATENTS

| | | | |
|---|---|---|---|
| 2,892,078 | 6/1959 | Orthuber | 246/249 |
| 3,210,539 | 10/1965 | Malaquin | 246/249 |

FOREIGN PATENTS OR APPLICATIONS

| | | | |
|---|---|---|---|
| 1,197,114 | 7/1965 | Germany | 246/249 |

Primary Examiner—Drayton E. Hoffman
Assistant Examiner—George H. Libman
Attorney—Kinzer and Dorn

[57] ABSTRACT

A railway wheel sensor, for detecting passage of a railway wheel, comprising two tuned pickup coils of large surface area having vertically oriented axes, spaced longitudinally of a railway rail with magnetic fields through which the wheel flange passes successively, the coils being connected in a bridge circuit excited by a high frequency signal, and a synchronous detector coupled to the bridge and to the excitation source, all mounted in a small, compact non-magnetic housing.

12 Claims, 6 Drawing Figures

INVENTOR
CARL G. BLANYER
BY Kinzer, Dorn and Zickert
ATTORNEYS

RAILWAY WHEEL SENSOR

BACKGROUND OF THE INVENTION

There are a wide variety of different devices for detecting the passage of wheels, cars, and trains, in railway operations, that control or actuate many different forms of railway equipment. For example, block signals and crossing warnings require advance indication of the approach of a train; although the extent of information necessary for actuation of these safety systems is quite limited, they must take precedence over all other right-of-way controls. Conventional warning systems usually use electrical wheel and axle contact between rails for detection purposes. Another example of a system requiring a wheel sensor or detector is the conventional hot box detector, utilized to check the condition of the axle bearings on the individual cars of a railway vehicle. Yet another common application of railway wheel sensors is in the control of car retarders, in marshalling yards, which must receive advance information as to the approach of individual cars and their speeds and which may be incorporated in relatively complex route switching systems.

Perhaps the most intricate control systems presently in use on railways, requiring the availability of car wheel sensors, are automatic car identification systems. For a control system of this kind the wheel sensor must indicate individual wheel passage, because the position of the identification labels carried by the cars is referenced to the car trucks. Another type of proposed system, which may or may not include automatic car identification, is a complete car-train monitor, adapted for either main line or yard usage, that controls the railway operation in virtually all respects. Such car monitor systems require specific timing information regarding the passage of each individual wheel under any and all operating conditions. These conditions include a wide range of car and train speeds, from over 100 miles per hour to zero. Indeed, what amount to negative speeds must be accommodated, encompassing situations of start-stop-reverse operations where reversal could occur precisely at the wheel sensor location. The wheel sensor must accommodate both directions of motion and must identify the direction in which the detected wheel is moving. Discrimination must be quite exacting in order to permit effective timing measurements to establish the speed of wheel movement. At the same time, the wheel sensor itself must be physically small enough to permit installation in high density yards and in other locations where space is at a premium.

The separate systems referred to above, all of which require effective wheel sensors though with differing technical requirements, are tending toward consolidation. That is, the separate systems for block signals, hot box detectors, car retarder control, and automatic car identification, using individual sensors, data processors, communication links, and displays, are being combined into integrated systems approaching the requirements of complete car-train monitors.

Most of the wheel sensors known in the art are magnetic and function basically as metal-detectors, with the mass of steel in a passing wheel altering the permeability of a magnetic path. Some have used static magnetic fields and others have employed alternating current fields of various frequencies. The obvious expedient of utilizing physical contact and displacement or deformation of a sensor element has proved unsatisfactory for wheel sensor units; direct contact devices are subject to unduly rapid wear and also tend to be too slow for high speed trains.

Even in the known magnetically actuated wheel sensors, there are a number of problems. The wheel sensors tend to be unduly sensitive to both axial and vertical wheel displacement, resulting from car dynamics and compounded by wide variations in the geometry of new and worn wheels of different types, which cause large variations in signal strength and waveform in the outputs of the wheel sensors, often resulting in the development of ambiguous signals. The prior art devices are also, in many instances, unduly sensitive to speed variations. The total electrical output of the wheel sensor is typically the combination of several stimuli, only one of which is intended, producing indeterminate operational results. In particular, some wheels and truck parts become partially magnetized in service, producing erroneous outputs from known wheel sensor apparatus. Other wheel sensors are dependent upon at least a minimal degree of movement by the wheel and are virtually useless at zero speed.

Electrical interference produces substantial problems in the operation of many different forms of wheel sensor. The common sources of such interference are lightning, signal currents in the railway rails, and the electrical fields of machinery mounted on locomotives and railway cars. Often, the wheel sensors must be critically adjusted and balanced, either mechanically or electrically or both, affording a continuing and difficult maintenance problem.

SUMMARY OF THE INVENTION

It is a principal object of the present invention, therefore, to provide a new and improved railway wheel sensor that effectively and inherently eliminates or minimizes the problems and difficulties of previously known wheel sensors as discussed above.

A further object of the invention is to provide a new and improved railway wheel sensor capable of operation in an ambient temperature range of at least −65°F. to +130°F. under the usual adverse weather conditions including strong sunlight, rain, frost, snow, dust and high winds, with little or no maintenance and over long periods of time.

Another object of the invention is to provide a new and improved wheel sensor for railway service that is small and compact and that is thoroughly compatible with existing trackside equipment, affording no interference with normal use of the track.

Another object of the invention is to provide a new and improved railway wheel sensor responsive to all of the usual types of engine and car wheels in all stages of normal surface wear and capable of accommodating normal horizontal shifting of the wheels and as much as an inch of wheel lift or bounce, including normal differences in flange depth caused by wheel wear. The wheel sensor is effective at all speeds from over 100 miles per hour down to zero, including reversals and abrupt jerks, and detects wheels that may not be rotating at normal speed and even may not be rotating at all.

A particular object of the invention is to provide a new and improved wheel sensor that is inherently nonresponsive to unintended parts of a car or train passing the sensor and that is not prone to develop false signals in the presence of electrical equipment, rail currents, or natural interference.

An additional object of the invention is to provide a new and improved railway wheel sensor that produces a single detectable output for the passage or presence of each railway wheel, an output that is eraseable or otherwise specifically identified if the direction of car movement reverses while the wheel is located precisely at the sensor.

A specific object of the invention is to provide a new and improved railway wheel sensor that affords an output signal of adequate precision to permit effective speed sensing and related timing measurements for wheels moving in either direction along the rail.

A railway wheel sensor constructed in accordance with the invention comprises a housing formed of non-magnetic material in at least its upper portion and adapted for mounting adjacent a railway rail below the head of the rail in position to clear the flange of a wheel moving along the rail. Two matched electrical sensing coils, each tuned to a given operating frequency, are mounted in the upper portion of the housing with their axes oriented vertically and are spaced from each other in a direction longitudinally of the rail; these two coils are utilized to generate electromagnetic fields which may overlap in the space above the housing that is traversed by the flange of a wheel moving along the rail. A bridge circuit is mounted in the housing with the two sensing coils connected in two adjacent arms of the bridge. Excitation means, mounted in the housing, are provided for applying a continuous balanced excitation signal to the bridge at the aforesaid given operating frequency. The wheel sensor further comprises synchronous detector means, mounted in the housing and electrically connected to the bridge and to the aforementioned excitation means, for detecting variations in the signal strength in at least one arm of the bridge containing one of the sensing coils; this synchronous detector means generates a control signal representative of the passage of a wheel flange through or the presence of a wheel flange in the field space above the wheel sensor housing.

DESCRIPTION OF THE PREFERRED EMBODIMENT

Figure 1:
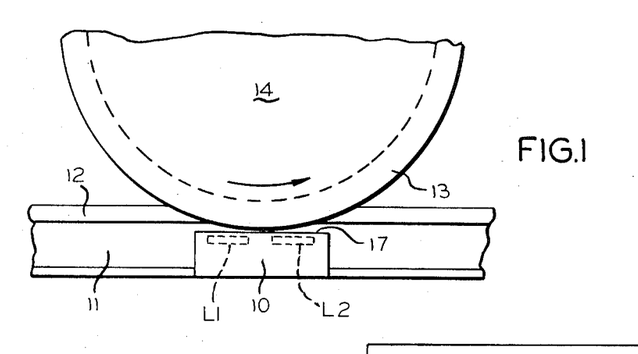
FIG. 1 is a side elevation view illustrating the mounting of a railway wheel sensor on a railway rail in position of operation.
Figure 2:
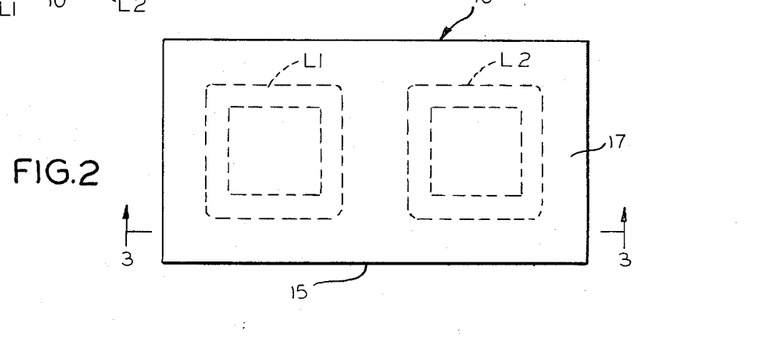
FIG. 2 is a plan view of a wheel sensor constructed in accordance with the invention.
Figure 3:
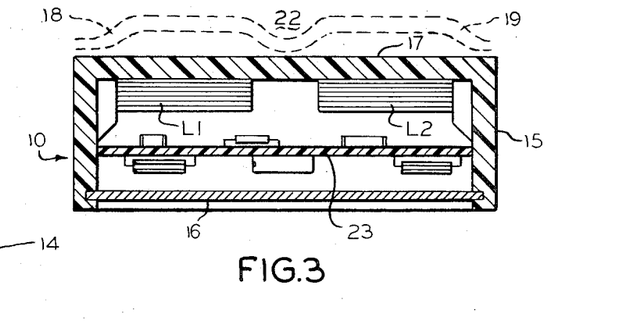
FIG. 3 is a sectional view taken approximately along line 3—3 in FIG. 2.
Figure 4:
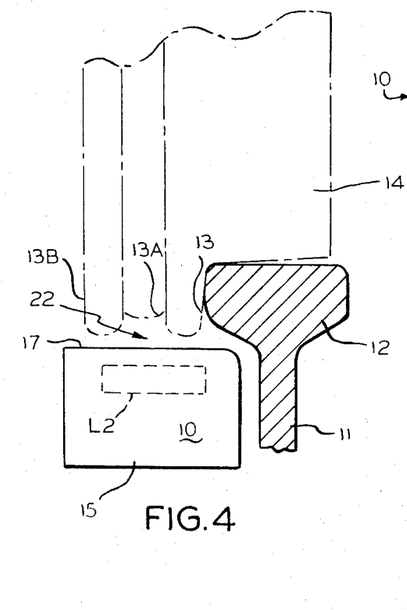
FIG. 4 is an end elevation view of the wheel sensor of FIGS. 2 and 3 showing the position of the wheel sensor in relation to a railway rail and a wheel traversing that rail.

FIGS. 1-4 illustrate the mounting and general usage of railway wheel sensor 10 constructed in accordance with a preferred embodiment of the present invention. As shown therein, wheel sensor 10 is mounted upon the base of a railway rail 11, a short distance below the head 12 of the rail in position to clear the flange 13 of a railway vehicle wheel 14 moving along rail 11. In FIG. 4, wheel 14 is shown with the flange 13 immediately adjacent the head 12 of the rail, and illustrates the clearance between flange 13 and the top of wheel sensor 10. The wheel sensor is also required to operate in connection with a wheel that is displaced outwardly from the rail as indicated by the flange outlines 13A and 13B. The wheel flange may also be displaced vertically, as indicated by the greater clearance between flange 13A and wheel sensor 10 than between flange 13 and the wheel sensor.

Wheel sensor 10 includes a housing 15 formed of resilient, non-conductive, non-magnetic material in at least its upper portion. In the illustrated construction, housing 15 is a molded box of polyurethane or other resilient elastomeric material, preferably formed in a single molded unit. The bottom of the housing may be closed by a metal plate 16, since the lower portion of the wheel sensor has no critical requirements with respect to magnetic or electrical properties as will be apparent from the operational description of wheel sensor 10 set forth hereinafter.

Two matched electrical sensing coils L1 and L2 are mounted in the upper portion of housing 15 immediately adjacent the top 17 of the wheel sensor. Coils L1 and L2 should be relatively short in height but should have horizontal dimensions great enough to extend to the outer limit of possible movement of the railway wheel flange 13 from the head 12 of the rail. That is, as shown in FIG. 4, the horizontal dimensions of the sensing coils should be great enough so that any operative wheel, regardless of wear condition, will not extend substantially beyond the outer edge of the coils. Coils L1 and L2 generate overlapping electromagnetic fields, generally indicated by the dash equipotential lines 18 and 19 (FIG. 3) in the field space 22 above housing 15 that is traversed by wheel flange 13 as the wheel moves along rail 11.

The electrical and electronic components of wheel sensor 10 are mounted within housing 15. These components are preferably supported upon a printed circuit board 23 of conventional construction supported within the housing and electrically connected to sensing coils L1 and L2. In the preferred construction, circuit board 23 is relatively flexible and resilient. By using a polyurethane or other elastomer housing 15 and a relatively flexible, resilient circuit board, the wheel sensor can withstand a substantial physical impact without damage to the sensing coils or the electrical and electronic components mounted on the circuit board.

Figure 5:
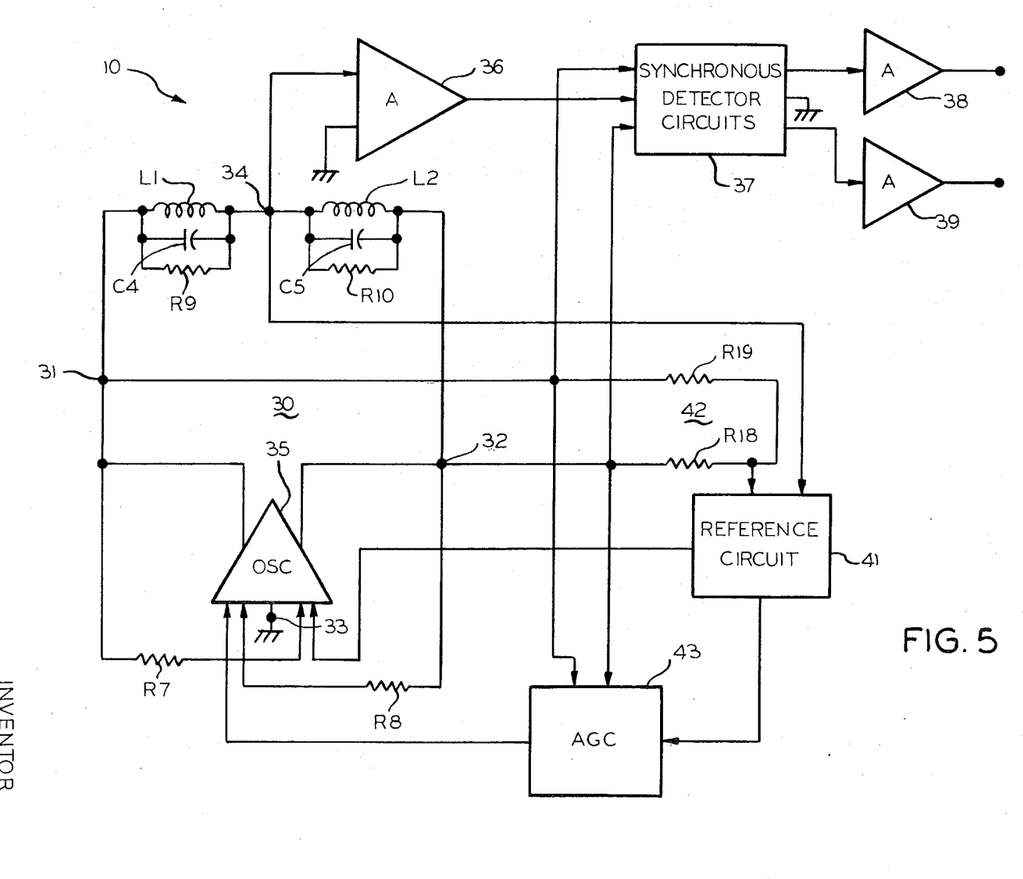
FIG. 5 is a block diagram, partially schematic, of a railway wheel sensor constructed in accordance with one embodiment of the invention.

FIG. 5 affords a block diagram, partially schematic in form, for the operating circuits of wheel sensor 10. As shown therein, wheel sensor 10 comprises a balanced bridge circuit 30 having input terminals 31 and 32 and output terminals 33 and 34. Sensing coil L1 is connected in one arm of bridge 30, between terminals 31 and 34. Sensing coil L2 is connected between bridge terminals 32 and 34 in an adjacent arm of the bridge. In the arm of the bridge between terminals 31 and 33 there is a resistor R7; resistor R7 is connected from terminal 31 to one input of a push-pull oscillator 35 that is connected to the system ground terminal 33 of the bridge. The adjacent arm of bridge 30 comprises a resistor R8 connected from bridge terminal 32 to the second input of oscillator 35. Oscillator 35, which is described in greater detail in connection with FIG. 6, has two outputs that are connected to terminals 31 and 32 respectively to complete an excitation means for applying a continuous balanced excitation signal to bridge circuit 30 at its input terminals 31 and 32.

Coils L1 and L2 are each tuned to a given operating frequency, preferably of the order of ten to fifteen kilohertz. The circuit arrangement is such that the tuned coils are relatively low Q circuits. Thus, a tuning capacitor C4 is connected in parallel with sensing coil L1 and a damping resistor R9 is also connected in parallel with the sensing coil. Similarly, a tuning capacitor C5 and a damping resistor R10 are connected in parallel with each other across sensing coil L2.

Bridge terminal 34 is connected to the input of an amplifier 36. Amplifier 36 has a second input connected to system ground and thus maintained at the same potential as bridge terminal 33. The output of amplifier 36 is connected to one input of a dual synchronous detector circuit 37. The synchronous detector circuits in the detector unit 37 are provided with additional input connections from the two outputs of oscillator 35, taken from bridge terminals 31 and 32. Detector unit 37 has two outputs, one connected to a first output amplifier 38 and the other connected to a second output amplifier 39.

Wheel sensor 10 further comprises a reference circuit 41 having two inputs, one of which is connected to bridge terminal 34. The second input to the reference circuit is taken from an auxiliary bridge circuit 42 comprising a resistor R18 connected from the main bridge terminal 32 to the reference circuit and a matched resistor R19 connected from bridge terminal 31 to the reference circuit. Reference circuit 41 includes an output circuit that is connected back to the input of oscillator 35. It also includes a further output that is connected to the input of an automatic gain control circuit 43. The AGC circuit 43 receives two additional inputs from oscillator 35, derived from bridge terminals 31 and 32. The output of AGC circuit 43 is applied to oscillator 35 to control the amplitude of excitation in bridge 30.

In operation, oscillator 35 develops a balanced high-frequency excitation signal that is supplied in phase opposition to the two input terminals 31 and 32 of bridge 30 and that is also supplied to the detector circuit 37, reference circuit 41, and AGC circuit 43. The excitation signal, in sensing coils L1 and L2, develops an electromagnetic field in the space immediately above the wheel sensor 10 as described in connection with FIGS. 1-4. As long as there is no disturbance of the field, there is no effective signal output from bridge 30 and no indication of the passage of a wheel along railway rail 11. The head 12 of rail 11 may project somewhat into the field space 22 above wheel sensor 10, depending upon the final position in which the wheel sensor is mounted, but this is a steady state condition that can be effectively balanced out by minor adjustments in the sensor position relative to the rail head.

As a railway wheel 14 approaches sensor 10, the flange 13 of the wheel enters the field space 22 above wheel sensor 10. The presence of the wheel flange in the field space initially disturbs the magnetic field of either coil L1 or coil L2, depending upon the direction in which the wheel is moving. Continued movement of the wheel brings it to a point where the flange is centered between the two sensing coils L1 and L2, and then to a point where the wheel flange constitutes a disturbing influence with respect to the second sensing coil but has little effect on the first coil. Thus, the wheel flange disturbs the magnetic fields of the two sensing coils L1 and L2 and initiates unbalanced voltages in the coils, in sequence, that can be detected and amplified to afford output signals indicative of movement of the wheel along the rail 11. As can be seen from FIG. 5, the operating circuit is fully symmetrical and hence can be readily controlled to maintain close balance when undisturbed.

The output from bridge 30 is neither irregularly variable nor abruptly switching in character. It follows a specific pattern with relatively little variation from wheel to wheel regardless of the state of wear, exact position, or speed of the wheel. The output signal pattern, from the bridge, shows the direction of wheel passage, while the timing of the waveform indicates speed.

When bridge 30 is in its undisturbed state, with no wheel flange in the field space above coils L1 and L2, the signal voltage to amplifier 36 is steady. Taking this voltage as zero (it may be some other steady voltage or it may actually be zero voltage), the voltage gradually increases as a wheel enters the field space above the wheel sensor until it reaches a roughly constant maximum. As the wheel continues its movement and the flange becomes centered over the space L1 and L2, the voltage decreases at a relatively abrupt rate, passes through the zero level, and then increases with the opposite polarity or phase until it achieves approximately the same rough maximum value. In a given circuit, for example, the total voltage swing in either direction, as induced in the coils, may be of the order of about 0.1 volt. As the wheel continues its movement beyond sensor 10, the induced voltage again subsides, somewhat more gradually than during the transitional movement of the wheel past the center of the sensor, until it reaches zero again. This waveform is repeated for each wheel that passes over sensor 10.

The output signals from bridge 30 are synchronously detected in the detector unit 37, which includes independent synchronous detector circuits for each polarity. Consequently, the output from detector unit 37 is a differential voltage between the two output leads of the detector; that is, the two detectors in unit 37 each yield an output of first one polarity and then the other. Moreover, a voltage is developed between each of these output leads and a common terminal, which may be grounded. One of these voltages rises as the other falls, and vice versa, affording an effective indication of the direction of wheel movement. In simple non-critical applications, these voltages can be used separately.

In the circuit generally illustrated in FIG. 5, the principal function of reference circuit 41 is to provide a high impedance source of unipotential operating current for the output stages of the oscillator 35. In addition, reference circuit 41 monitors the balance of the bridge input by means of the auxiliary bridge 42 comprising the matched resistors R18 and R19 and injects a corrective signal back into the oscillator to minimize unbalance. Finally, reference circuit 41 provides a D.C. reference potential for AGC circuit 43.

AGC circuit 43 compares the magnitudes of the oscillator output voltages with the D.C. reference signal received from circuit 41. On the basis of this comparison, the AGC circuit generates a control signal to adjust the overall gain of the oscillator-amplifier 35. Accordingly, the AGC circuit 43 serves as an amplitude regulator for the bridge excitation voltage.

The principal sources of potential interference for a device such as sensor 10, as noted above, include the fields from electrified railways, lightning, and power lines. To assist in rejecting such interference, sensing coils L1 and L2 are preferably constructed as relatively low-inductance coils. The physical arrangement of wheel sensor 10 is made as symmetrical as mechanically possible, so that a balanced field encountered by coils L1 and L2 does not produce a false indication of wheel passage. The utilization of synchronous detectors, in the output stage of wheel sensor 10, aids materially in interference rejection, as does the use of a balanced output for the device. Physical damage from surges, such as lightning, may be minimized by installation of standard surge protectors on the connecting lines to the wheel sensor.

Wheel sensor 10, used as described above, can function over a broad temperature range, including ambient temperatures up to 130°F under direct sunlight; the sensor itself will be substantially hotter. For low temperature operation, heaters can be installed within housing 15, although for many applications this is unnecessary because the solid state electronic components preferably used for the operating circuits of the wheel sensor can function at quite depressed temperatures. The sensor is not damaged and can continue uninterrupted operation at temperatures down to at least 0°F. even without auxiliary heaters.

With respect to the physical construction of coils L1 and L2, there is no need for magnetic cores or external shells, pole pieces, or other magnetic "guiding" structures. In fact, the fields of these thin, flat coils cannot usefully be extended or concentrated at a distance from the coil by such auxiliary core or shell means. The coils should be mounted vertically and as close as possible to the region in space that may be occupied by a wheel flange. As noted above, the coils should be large in their horizontal dimensions; more specifically, the horizontal dimensions of the coils should be comparable to the breadth of the space that may be occupied by the flange of a wheel passing the wheel sensor, regardless of the anticipated horizontal displacement of the wheel. On the other hand, a large axial dimension for sensing coils L1 and L2 is of no assistance and may tend to reduce coil sensitivity. It is quite important that coils L1 and L2 be tuned approximately to the operating frequency of oscillator 35; untuned coils are not sufficiently sensitive for effective operation. Individually tuned coils, as illustrated, afford adequate sensitivity and other operating virtues. On the other hand, high-Q coils are not particularly desirable because they tend to be unduly sensitive and to produce erroneous signals when their fields are disturbed by factors other than the passage of a wheel flange; resistors R9 and R10 are utilized to adjust the Q of the coils to a relatively low level (e.g., about 10 to 14).

The sensitive elements of wheel sensor 10, particularly in bridge circuit 30, do not require absolute stability with changes in environmental factors such as temperature, aging, humidity, and the like. With a completely symmetrical circuit, as indicated, close tracking between the components in corresponding branches of the bridge circuit is adequate. A shift in the reactance of either of the two sensing circuits primarily causes a shift in the quadrature null of the bridge which is ignored by the synchronous detector circuits employed in detector unit 37, so that erroneous signalling from this source is not a critical factor. Experimental deformation of the coils has shown that structural rigidity is not critical; some minor bending or other physical distortion may occur but is readily handled by the synchronous demodulator circuits used in detector 37. In the preferred construction, the indicated impedance of each tuned coil is about 1000 ohms for a reactance of about 80 to 90 ohms, affording an operating Q of about 12. Such coils are considerably less sensitive than other large higher-inductance coils to external disturbances of some types, resulting in a substantial noise reduction. The overall circuitry requires no transformers, a factor of substantial importance in maintaining a high degree of symmetry in the balanced driving signal for bridge 30.

Figure 6:
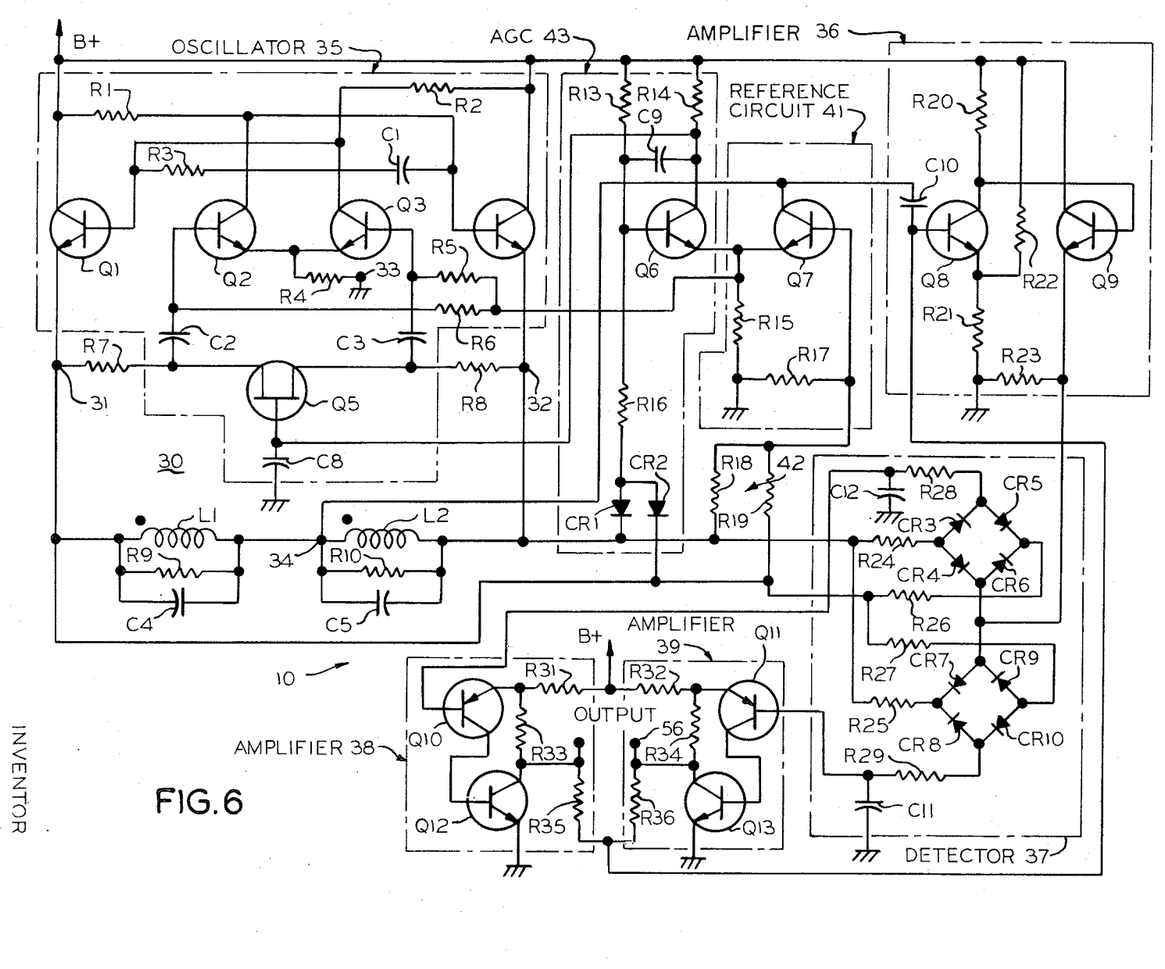
FIG. 6 is a schematic circuit diagram of one operating circuit for a wheel sensor constructed in accordance with the invention.

FIG. 6 affords a detailed circuit diagram for wheel sensor 10, including all of the circuits referred to above in connection with FIG. 5. In the circuit shown in FIG. 6, oscillator amplifier 35 comprises four transistors Q1, Q2, Q3 and Q4. The collector of transistor Q1 is connected to a suitable B+ supply and the emitter is connected to bridge terminal 31. The base electrode of transistor Q1 is connected to a resistor R2 that is returned to the B+ supply and is also connected to the series combination of a resistor R3 and a capacitor C1 that is connected to the base of transistor Q4. The base of transistor Q4 is also connected to a resistor R1 that is returned to the B+ supply. The collector of transistor Q4 is connected to the B+ supply and the emitter is connected to bridge terminal 32.

The collector of transistor Q2 is connected to the base of transistor Q4, whereas the collector of transistor Q3 is connected to the base of transistor Q1. The emitters of transistors Q2 and Q3 are connected to each other and are also connected to a resistor R4 that is returned to system ground at the bridge terminal 33.

The base electrode of transistor Q2 is connected to a capacitor C2 that is in turn connected to resistor R7 and to one of the source and drain electrodes of a field effect transistor Q5. Similarly, the base of transistor Q3 is connected to a capacitor C3 which is in turn connected to resistor R8 and to the other source or drain electrode of the field effect transistor Q5. The gate of transistor Q5 is connected to a capacitor C8 that is returned to system ground.

Amplifier 36, in the circuit illustrated in FIG. 6, comprises two transistors Q8 and Q9. Transistor Q8 is the input stage for amplifier 36 and has its base electrode coupled to the output terminal 34 of bridge 30 by capacitor C10. The collector of transistor Q8 is connected to the B+ supply through a resistor R20. The emitter of transistor Q8 is connected to a resistor R21 that is returned to ground, thus affording a common reference with respect to the grounded terminal 33 of bridge 30. The emitter of transistor Q8 is connected to a resistor R22 that is returned to the B+ supply, affording a bias for the emitter. The base electrode of transistor Q9 is directly connected to the collector of transistor Q8. The collector of transistor Q9 is connected to the B+ supply. The emitter of transistor Q9 is returned to ground through a resistor R23 and is also connected to an input terminal 51 in the synchronous detector unit 37.

One of the two synchronous detector circuits in detector unit 37 comprises four diodes CR3 through CR6 connected in a bridge circuit. The common terminal for the cathode of diode CR4 and the anode of diode CR6 is connected to the input terminal 51. The common terminal for the anodes of diodes CR3 and CR4 is connected to a resistor R24 that is in turn connected to the main bridge terminal 32. The common terminal for the cathodes of diodes CR5 and CR6 is connected through a resistor R26 to bridge terminal 31. The output terminal of the bridge, the common terminal for the cathode of diode CR3 and the anode of diode CR5, is connected to a resistor R28. Resistor R28 is connected in a low-pass R-C filter circuit that includes a capacitor C12 which is returned to ground. Resistor R28 is also connected to the base electrode of a transistor Q10 that comprises the input stage of amplifier 38.

The detector unit 37 further comprises a second diode bridge including four diodes CR7 through CR10. The input terminal of the bridge, common to diodes CR7 and CR9, is connected to the input terminal 51. The common terminal for the anodes of diodes CR9 and CR10 is connected to a resistor 27 that is connected to bridge terminal 31. Similarly, the common cathode terminal for diodes CR7 and CR8 is connected to a resistor R25 that is connected to bridge terminal 32. The output of this demodulator bridge, comprising the common terminal of diodes CR8 and CR10, is connected to an output resistor 29 that is in turn connected to the base of an input transistor Q11 in amplifier 39.

A capacitor C11 is connected from resistor R29 to ground, forming a low-pass filter circuit with the resistor.

In amplifier 38, the emitter of input transistor Q10 is connected to a resistor R31 that is returned to the B+ supply. The collector of transistor Q10 is connected to the base of an output stage transistor Q12. The emitter of transistor Q12 is connected to system ground. The collector of transistor Q12 is connected to the B+ supply through the series combination of a resistor R33 and resistor R31. The collector of transistor Q12 is also connected to an output terminal 55. In addition, the collector of transistor Q12 is connected to a resistor 35 that is in turn connected to the base electrode of transistor Q8 in amplifier 36.

Amplifier 39 corresponds in construction to amplifier 38. The collector of the input transistor Q11 is connected to the base of an output transistor Q13. The emitter of transistor Q11 is connected to the B+ supply through a resistor R32 that is also connected in series with a resistor R34 to the collector of transistor Q13. The emitter of transistor Q13 is grounded. The collector of transistor Q13 is connected to an output terminal 56 and is also connected to a resistor R36 that is in turn connected back to the base electrode of transistor Q8 in the input of amplifier 36.

Reference circuit 41, in the wheel sensor shown in detail in FIG. 6, comprises a single transistor Q7. The base electrode of transistor Q7 is connected to the auxiliary bridge comprising resistors R18 and R19 and is also connected to a resistor R17 that is returned to system ground. The emitter of transistor Q7 is connected through a resistor R5 to the base electrode of transistor Q3 in oscillator 35 and is also connected through a matching resistor R6 to the base electrode of transistor Q2 in the oscillator. The emitter of transistor Q7 is also connected to a resistor R15 that is returned to system ground. The collector of the reference circuit transistor Q7 is A.C. coupled to the base of transistor Q8 in amplifier 36 by a capacitor C10 and is also connected directly to output terminal 34 of the main bridge 30.

The automatic gain control circuit 43 comprises a transistor Q6 having its emitter connected directly to the emitter of transistor Q7 in reference circuit 41. The base of transistor Q6 is connected to a resistor R13 that is in turn connected to the B+ supply. The base of transistor Q6 is also connected through a resistor R16 and a diode CR1 to the main bridge terminal 32 and through resistor R16 and a diode CR2 to bridge terminal 31. A capacitor C9 is connected between the base and the collector of transistor Q6. The collector of transistor Q6 is connected through a resistor R14 to the B+ supply and is also connected directly to the gate of the FET transistor Q5 in oscillator 35.

The general operation of the circuit of FIG. 6 corresponds to that set forth above for FIG. 5, but there are a number of specific operational features worthy of particular note. To begin with, the four transistors Q1-Q4 in oscillator 35 preferably comprise individual sections of a multiple-transistor integrated circuit array. The inherent matching in an arrangement of this kind is a substantial aid to balance in the basic oscillator circuit. The oscillator is, essentially, a two-stage differential amplifier with each side comprising a common emitter stage followed by a common collector buffer stage. The positive and negative feedback paths are collapsed into the single string of resistors R7 and R8 and the field effect transistor Q5 serves as a variable-voltage resistance in the feedback circuit. The equivalent resistance of transistor Q5 sets the value of the differential driving signal applied between transistors Q2 and Q3. That is, the gain of the oscillator amplifier is proportional to the resistance afforded by transistor Q5, which is small in normal operation. The matching and common mode rejection of the differential pair results in well-balanced outputs despite variations between resistors R7 and R8.

In the automatic gain control circuit 43, transistor Q6 serves as a filter-amplifier. The output of transistor Q6 adjusts the bias on the base of the FET transistor Q5 to maintain the oscillator amplitude essentially constant.

As noted above, the reference circuit 41 comprising transistor Q7 performs a plurality of functions. Its principal function is to afford a constant-current source for the bridge terminal 34 at the junction of the two sensing coils L1 and L2. This eliminates the signal-power waste inherent in a shunt feed circuit without loading the signal output at terminal 34. The bias for transistor Q7 is the average of the voltages of the oscillator output, derived through resistors R18 and R19; the A.C. components tend to cancel, leaving only a D.C. level as the bias for transistor Q7. This level may tend to shift and hence to change the value of the constant current supplied to the oscillator, but this is not critical.

The bias for transistors Q2 and Q3, in oscillator 35, is derived from the emitter of the reference circuit transistor Q7, through resistors R5 and R6. Roughly half of any shift in output D.C. level for the oscillator is applied to transistors Q2 and Q3 as a correction voltage so that the operating points of the entire oscillator circuit are stabilized.

As noted above, resistors R18 and R19 from two arms of an auxiliary bridge 42 that is excited by the oscillator. Any A.C. voltage at the junction resulting from imperfect cancellation is injected, by way of resistors R5 and R6, into the oscillator in common mode, adding to the drive on one side of the oscillator and reducing it on the other, thus acting as a balancing means that drives the A.C. voltage at the base of transistor Q7 toward zero. The push-pull output voltages are in the same ratios as resistors R18 and R19; this ratio tends to remain fixed for any variations in the oscillator that tend to disturb balance. If resistors R18 and R19 are accurately matched and tend to drift by corresponding amounts, the ratio remains fixed at unity and the oscillator is stabilized near true balance. Consequently, variations in components in the basic oscillator have little effect on balance, although deviation in the matching or tracking of resistors R18 and R19 tend to affect balance directly.

The last and related function of the reference circuit 41 is to reduce still further any effective unbalance at the signal output, terminal 34. Approximately a quarter of any shift in A.C. balance between the push-pull outputs of the oscillator appears at the base of transistor Q7. The A.C. gain of transistor Q7 is roughly two. Accordingly, approximately one-half of any oscillator balance shift that does occur is injected into the coil junction 34 in opposing phase to the same signal that appears at the junction directly.

The two-section synchronous ring detector circuit 37, which is excited directly from the two outputs of oscillator 35, affords two differential half-wave outputs. The illustrated circuit is somewhat unusual in that, because the detectors disconnect the filters (R28, C12 and R29, C11) from the source during the passive half-cycle, and because the filters are lightly loaded, the voltages on the filter capacitors do not tend to decay during the passive half-cycle. Consequently, the filtered output voltage of the synchronous detector stage is about double that of a normal half-wave circuit and approaches the output of a true full-wave detector.

Resistors R35 and R36 afford a common-mode feedback path from amplifiers 38 and 39 to the input of amplifier 36. The average voltage of the outputs 55 and 56 is fed back for comparison with the D.C. voltage at the junction of resistors R21 and R22. The feedback circuit maintains the average of the voltages at terminals 55 and 56 relatively constant at approximately two volts D.C. despite changes in amplifiers 36, 38 and 39 and detector 37. The quiescent state voltages on output terminals 55 and 56 are thus approximately two volts D.C. When the field of sensing coil L1 is disturbed by entry of a wheel flange, the voltage on terminal 55 increases markedly, and the potential at terminal 56 drops toward zero. Conversely, when the field of sensing coil L2 is disturbed by passage of a wheel flange, the voltage on terminal 56 increases and that on terminal 55 decreases. Thus, the output signals, by their sequence, afford an accurate and effective measure of wheel movement direction.

The amplitude of the output signals is somewhat speed dependent, but the sensor works efficiently over a speed range up to more than 100 mph. As wheel speed increases, the amplitude of the output voltage change decreases, and the change occurs somewhat later in time. The effect is appreciable only at speeds over 100 mph. At lower speeds, including zero, response is substantially independent of speed. The timing of the signals from output terminals 55 and 56 affords a measure of wheel speed. Timing variations, at any given speed, are primarily a function of flange condition and spacing, and may be as great as +10 percent.

The entire package for wheel sensor 10 is quite small, being approximately that of an ordinary brick. Thus, the entire device can be fitted into a housing approximately 9 inches long, 4 inches wide, and 2 ½ inches deep.

In order to afford a more complete example of the invention, explicit circuit parameters for a specific form of the wheel sensor, based on FIG. 6, are set forth hereinafter. It should be understood that this information is presented solely by way of illustration, and in no sense as a limitation on the invention.

RESISTORS

| | |
|---|---|
| R1, R2 | 8.2 kilohms |
| R3 | 270 ohms |
| R4, R21 | 1.2 kilohms |
| R5, R6, R22 | 27 kilohms |
| R7, R8, R14 | 100 kilohms |
| R9, R10 | 4.02 kilohms |
| R13 | 1 megohm |
| R15 | 220 ohms |
| R16 | 3.9 kilohms |
| R17, R33, R34 | 2.7 kilohms |
| R18, R19 | 5.62 kilohms |
| R20 | 18 kilohms |
| R23 | 4.7 kilohms |
| R24, R25, R26, R27 | 10 kilohms |
| R28, R29 | 22 kilohms |
| R31, R32 | 3.3 kilohms |
| R35, R36 | 47 kilohms |

CAPACITORS

| | |
|---|---|
| C1 | 100 picofarads |
| C2, C3 | 0.05 microfarad |
| C4, C5 | 0.1 microfarad |
| C8 | 2 microfarad |
| C9, C10 | 0.01 microfarad |
| C11, C12 | 0.02 microfarad |

SENSING COILS

| | |
|---|---|
| L1, L2 | 2 millihenries |

SEMI-CONDUCTOR DEVICES

| | |
|---|---|
| Q1–Q4 and Q12 | RCA CA 3046 |
| Q6–Q9 and Q13 | RCA CA 3046 |

| | |
|---|---|
| Q5 | 2N5448 |
| Q10, Q11 | 2N3906 |
| CR1, CR2 | 1N4446 |
| CR3–CR6 | CA3019 |
| CR7–CR10 | CA3019 |

SUPPLY VOLTAGE

B+                17.4 volts D.C.

I claim:

1. A railway wheel sensor comprising:
a housing, formed of non-magnetic material in at least its upper portion and adapted for mounting adjacent a railway rail below the head of the rail in position to clear the flange of a wheel moving along the rail;
two matched electrical sensing coils, each tuned to a given operating frequency, mounted in the upper portion of said housing with their axes oriented vertically and spaced from each other in a direction longitudinal to said rail, for generating two electromagnetic fields of essentially identical configuration in the space above said housing traversed by the flange of a wheel moving along the rail;
a bridge circuit, mounted in said housing, said sensing coils being connected in two adjacent arms of the bridge;
excitation means, in said housing, for applying a continuous balanced excitation signal to said bridge circuit at approximately said given frequency;
and synchronous detector means, mounted in said housing and electrically coupled to said bridge and to said excitation means, for detecting variations in the relative signal strengths in the arms of the bridge containing the sensing coils, caused by detuning of the individual coils upon movement of a wheel flange into the field space above said housing, and for generating a control signal indicative of the wheel flange movement through the field space.

2. A railway wheel sensor according to claim 1, in which said detector means comprises a pair of synchronous detectors and a differential amplifier, producing a control signal varying in polarity sequence in accordance with the direction of movement of a railway wheel traversing the rail.

3. A railway wheel sensor according to claim 2, in which each of said synchronous detectors is a diode bridge detector coupled to an input of said differential amplifier by a resistance-capacitance low-pass filter, so that the filtered signal input to the differential amplifier approaches the amplitude of a full-wave detector.

4. A railway wheel sensor according to claim 1, in which said housing is of resilient molded elastomer material permitting substantial distortion of the housing without permanent deformation.

5. A railway wheel sensor according to claim 4, in which the remaining principal components of the sensor, other than said coils, are mounted upon a relatively flexible circuit board mounted within said housing.

6. A railway wheel sensor according to claim 1, in which each sensing coil is a low-inductance high-Q coil having a damping resistor connected in parallel therewith to afford a drift-stabilized sensing inductance.

7. A railway wheel sensor according to claim 1, in which said excitation means comprises an oscillator and in which said tuned sensing coils constitute frequency-determining elements for said oscillator.

8. A railway wheel sensor according to claim 7, in which said sensing coils are of flat configuration, each having horizontal dimensions approximating the maximum possible horizontal displacement of a railway wheel flange from the head of the rail and a substantially smaller vertical dimension.

9. A railway wheel sensor according to claim 7, in which said excitation oscillator has two output terminals connected to two respective opposed corners of said bridge, at opposite ends of the two bridge arms comprising said coils, constituting the input terminals of said bridge, said sensor further comprising an automatic gain control circuit for maintaining the amplitude of excitation of said bridge within a given limited range.

10. A railway wheel sensor according to claim 9, in which said oscillator comprises a cross-coupled differential amplifier, in which the remaining two arms of said bridge comprise matched resistors connected to respective ones of the source and drain electrodes of a field-effect transistor, and in which said automatic gain control circuit comprises a filter amplifier having its input connected to said output terminals of said bridge and having its output connected to the gate electrode of said field-effect transistor.

11. A railway wheel sensor according to claim 9, and further comprising a constant-current reference circuit connected to one output terminal of the bridge at the junction of said sensing coils, said constant-current source comprising an auxiliary bridge including two matched resistances connected in series across said sensing coils, and a transistor having its control electrode connected to an output terminal of the auxiliary bridge, its input electrode connected to an intermediate stage in said excitation means, and its output electrode connected to said one output terminal of the principal bridge.

12. A railway wheel sensor according to claim 11, in which said reference circuit is also connected to said automatic gain control circuit to maintain balanced operation in said oscillator.

* * * * *